United States Patent Office 2,818,350
Patented Dec. 31, 1957

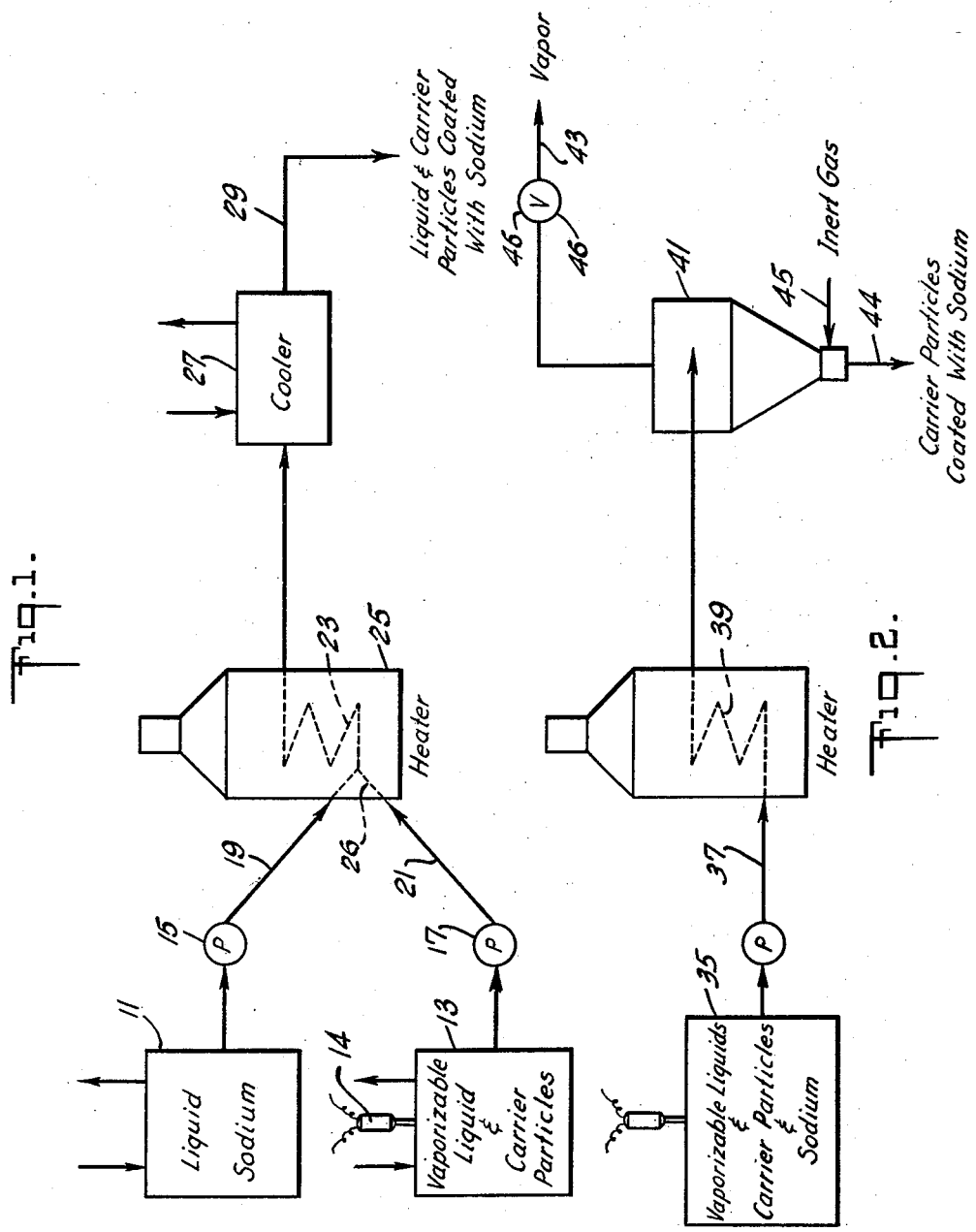

2,818,350

PREPARING ALKALI METAL COATED CARRIER PARTICLES

Kevin E. Kavanagh, Douglaston, N. Y., assignor to Texaco Development Corporation, New York, N. Y., a corporation of Delaware Application September 9, 1955, Serial No. 533,295

11 Claims. (Cl. 117—100)

The present invention relates to an improved method for preparing high surface alkali metal.

Alkali metals, particularly sodium, have been used for performing various chemical reactions such as refining hydrocarbons, preparing alcohol-free alkoxides, halide condensation reactions, hydrogenation of esters such as fats and of acids to alcohols, removing mercaptans from hydrocarbons, and reduction of titanium tetrachloride to metal. It has been found, however, that reaction time in general is too great, and temperature control is difficult when using particles of sodium metal alone.

In accordance with the present invention high surface alkali metal is provided by coating solid particles of an inert carrier substance with the metal. First, there is formed a flowable mixture of alkali metal, inert carrier particles, and a vaporizable liquid which is inert to the alkali metal. This mixture is passed as a flowing stream into and through a vaporization zone wherein the mixture is heated sufficiently to vaporize at least a substantial part of the liquid to vapor. Then the mixture and vapor are subjected to high velocity and turbulent flow by passing them through a long tubular zone so that alkali metal particles impinge upon the solid particles of carrier and coat them with a thin layer.

The term "alkali metals" is used herein to include lithium, sodium, potassium, rubidium and cesium, and also alloys of two or more such metals with each other, for example potassium-sodium alloys. For simplicity of description, the following description will refer to sodium, but it is to be understood that the principles are also applicable to the other alkali metals. Also, alumina will exemplify the inert carrier, although other materials may also be used, such as silica, talc, soda ash, clay, diatomaceous earth, and such forms of carbon as coke and charcoal.

In the drawings Figs. 1 and 2 are schematic flow diagrams showing two alternative arrangements of apparatus for performing the method.

Referring to Fig. 1, a body of molten sodium in a tank 11 is maintained at a temperature above the melting point, namely 97.81° C., by circulating hot kerosene through coils immersed in the sodium, or by otherwise heating the sodium.

Concurrently, a flowable mixture such as a slurry is made up in a second tank 13 by mixing together finely divided inert alumina carrier particles with a vaporizable liquid such as kerosene which is inert to sodium metal, and has a boiling point or range above the melting point, and preferably below the boiling point, of sodium. A conventional motor driven agitator 14 acts to suspend the solid particles in the liquid.

Kerosene is mentioned only to illustrate the principles of the invention, other liquids also being usable such as:

| | |
|---|---|
| Petroleum jelly | Cetane |
| Sodium purified naphthalene | Nujol |
| Tetralin | Toluene |
| Dodecene | Dimethoxy decane |
| Deobase kerosene | Fuel oil |
| Heptane | Mineral oil |
| No. 332 White oil | Xylene |

The proportion of alumina particles contained in the mixture in tank 13 may vary over a wide range, as between 35 and 65% of the mixture by weight. However, a mixture containing about 50% by weight of alumina is generally preferred.

Liquid sodium from tank 11 and slurry from tank 13 are then passed by pumps 15 and 17 through conduits 19 and 21, which meet and merge at the entrance to a tube 23 which is coiled or otherwise arranged within a heater 25. Heater 25 may be heated in any desired way, as by a gas or oil flame.

To assure that the temperature of slurry from tank 13 approximately equals that of the liquid sodium, a portion 26 of pipe 21 is arranged within heater 25. If desired, the slurry may also be heated in tank 13 by circulating steam or hot kerosene through coils immersed therein.

The slurry and molten sodium mix together and flow through tube 23 while being heated until all or a substantial part of the kerosene is vaporized and a high velocity turbulently flowing stream is developed. A velocity in excess of 25 feet per second and preferably in excess of 100 feet per second is reached. During such flow the molten sodium forms into tiny liquid particles or droplets which contact or impinge against the alumina carrier particles and coat their surfaces with sodium. Not only will the outer surface areas be coated, but also molten sodium will be drawn by capillary action into the pores of the alumina particles to extend the sodium surface area. At the same time, the alumina particles may also disintegrate to a finer size by impinging against one another and the walls of the tube. Such disintegration of the alumina particles is most marked when the starting material includes relatively coarse particles, such as coarser than 200 mesh (U. S. Standard). There will be practically no further disintegration when the initial particle size is very small, such as 10 microns or less.

An advantage of using a liquid having a wide boiling range, such as kerosene, is that at a temperature between the bottom and top of the boiling range there remains a substantial proportion of liquid which receives sodium-coated alumina particles to coat them and prevent corrosion.

In the tube 23 a maximum temperature is reached which is above the boiling point, or in the upper part of the boiling range of the vaporizable liquid, but is well below the boiling point of sodium. For some liquids such as kerosene the boiling range may be as wide as 200° F. The pressure as the entrance to tube 23 may vary greatly as between 50 and 400 pounds per square inch gauge (p. s. i. g).

The effluent from tube 23 then enters a cooler 27 wherein the temperature is brought down below the melting point of sodium so that the liquid sodium film covering the alumina particles and within their pores is solidified. Kerosene coating the individual particles prevents them from adhering to one another, as also results from the existence of a large part of the sodium within the pores of the alumina due to adsorption. Cooling may be accomplished by indirect heat exchange with a cool inert fluid such as kerosene or inert gas, or by directly injecting such a cool fluid into the effluent.

From cooler 27 the product mixture of kerosene containing unbonded discrete sodium coated alumina particles is discharged through a line 29 and can be supplied directly to a chemical reaction, or can be run to storage. If desired, part or all of the liquid content of the product may be removed, as by filtration or centrifuging, advantageously in the presence of an inert gas to protect the sodium from oxidation.

The heating zone in tube 23 may have dimensions based upon the desired capacity of a plant. Tube diameters may range from ½ to 2 inches, for example, and lengths may be as little as 100 or as much as 1000 feet, more or less.

The proportion of sodium to alumina particles may also vary, although it is desirable to avoid an excess of sodium to prevent the particles from adhering together upon conclusion of the operation. A proportion of one part by weight of metal to between 1 and 20 parts of carrier is satisfactory.

The size of the carrier particles may also vary considerably, but in general particles of alumina or other carrier which are initially all finer than 200 mesh and about 50% finer than 325 mesh may be employed. These particles generally are reduced considerably in size during their passage through tube 23, and the final sodium coated particles may average as little as 10 microns in diameter. Of course these particles provide an extremely large sodium surface for chemical reactions per unit weight of sodium, much more than even smaller individual sodium particles will provide.

*Example I*

There is formed in the tank 13 a slurry comprising 50% by weight of kerosene and 50% by weight of alumina particles, all finer than 200 mesh and 50% finer than 325 mesh. This slurry is pumped through conduit 21 into a ¼ inch iron heater tube 23 200 feet long at a rate of 400 pounds per hour, while liquid sodium at a temperature of 250° F. is pumped from tank 11 into tube 23 at a rate of 34 pounds per hour. Pressures in both instances are 200 p. s. i. g. Before meeting the sodium stream the slurry from tank 13 is raised to a temperature of 220° F. in tube section 26.

The mixture passing through tube 23 is heated therein to a temperature of 550° F. so that a substantial part of the kerosene is vaporized, while a portion remains liquid to receive fine particles of alumina coated with liquid sodium.

Upon discharge of the mixture into cooler 27 at atmospheric pressure it is cooled to 100° F. by indirect heat exchange with cool kerosene. The resulting kerosene slurry of alumina particles coated with solid sodium is then discharged through conduit 29.

Referring to Fig. 2, there is shown an arrangement of apparatus for operating with either liquid or solid sodium. There is made up in a tank 35 a flowable slurry of sodium, alumina particles, and an inert vaporizable liquid such as kerosene. The sodium may be in the form of coarse particles in the slurry or the slurry in tank 35 may be heated to a temperature to melt the sodium. When the alumina particles are to be coated by contact with liquid sodium, this slurry is pumped through a conduit 37 into a heater coil 39 wherein the heating operation is as described above in connection with Fig. 1. The temperature may be within the boiling range, or above the top boiling temperature of the kerosene.

The effluent enters a cyclone type of centrifugal separator 41 wherein the vapors are separated and pass off the top through a conduit 43. The solid alumina particles coated with sodium fall to the bottom of the separator and leave through a conduit 44, meanwhile cooling to a temperature below the melting point of sodium. When all of the kerosene has been vaporized the sodium is no longer protected by kerosene in this modification. Therefore, it is imperative to introduce an inert fluid such as argon or nitrogen through a line 45 to protect the sodium from reaction with air or water vapor. When part of the kerosene has remained liquid and accompanies the particles in separator 41, no such supplemental protection ordinarily is required.

This apparatus of Fig. 2 also may be operated by employing as the vaporizable liquid a liquid which all or partly boils below the melting point of sodium, so as to retain sodium particles in a solid condition and enable them to coat the alumina particles by rubbing as they pass through tube 39. Examples of such vaporizable liquids are gasoline, having a boiling range at atmospheric pressure of 38 to 204° C., propane having a boiling point of —42° C. and butane having a boiling point of —0.5° C.

In the case of liquefied gases, such as propane and butane, it is only necessary to pass warm water in heat exchange relationship with the pipe coil 39 to generate enough gas volume to provide the necessary high velocity and turbulence to cause the solid sodium particles to rub off on the alumina carrier particles.

Upon entering the cyclone separator 41, the gaseous propane or butane pass off the top and are reliquefied for reuse, while the sodium coated alumina particles pass off the bottom and may be used immediately, or may be passed into kerosene for storage. By regulating a valve 46 in conduit 43, a small proportion, such as 10%, of the hydrocarbon gas leaves with the solid particles through conduit 44 to protect them from air and water vapor. Otherwise, inert gas should be bled in from conduit 45.

Alternatively, a condenser may be substituted for the cyclone 41 and the carrier liquid totally or partially condensed to form a slurry of sodium coated carrier particles in liquefied gas or kerosene.

When gasoline or the like is used as the vaporizable liquid the tube 39 is heated only mildly to a temperature a few degrees below 97.1° C. so as to generate the necessary high velocity turbulent flow while maintaining the sodium in a solid state.

*Example II*

A slurry is made up under a pressure of 25 p. s. i. g. in a pressure tank 35 comprising 50% of cool liquefied butane at a temperature of 0° C., 45% of powdered alumina and 5% of sodium particles, all by weight. The alumina carrier particles have a fineness such that all pass a 200 mesh sieve and 50% pass a 325 mesh sieve. The sodium particles average about ⅛ inch in diameter.

This slurry is pumped from tank 35 into coil 39 of ¼ inch iron pipe 200 feet long at a rate of 350 pounds per hour, and the butane is vaporized by passing warm water over the coil. The inlet pressure to pipe coil 39 is 150 p. s. i. g. and the maximum temperature reached in coil 39 is 85° F.

Upon discharge of the effluent into cyclone separator 41, 90% of the butane vapors pass off the top and are reliquefied for reuse in the process. The solids comprising alumina particles coated with sodium pass off the bottom through conduit 43 along with the remaining butane vapors.

Obviously, many modifications and variations of the invention, as hereinbefore set forth, may be made without departing from the spirit and scope thereof, and therefore only such limitations should be imposed as are indicated in the appended claims.

I claim:

1. A method for preparing high surface alkali metal which comprises coating solid particles of an inert carrier substance with alkali metal by forming a flowable mixture of said alkali metal, said particles, and a vaporizable liquid which is inert to said alkali metal; passing said mixture as a flowing stream into a vaporization zone; heating said mixture sufficiently to vaporize at least part of said liquid to vapor; and subjecting said mixture and said vapor as a flowing stream to high velocity and turbulent flow such that alkali metal impinges upon said solid particles thereby coating said particles.

2. A method in accordance with claim 1 wherein said alkali metal is sodium, and wherein said carrier substance is selected from the group consisting of alumina, carbon, soda ash, silica, talc, clay and diatomaceous earth.

3. A method in accordance with claim 1, also comprising condensing said vapor to form a mixture comprising alkali metal coated particles in inert liquid.

4. A method in accordance with claim 1 wherein all of said liquid is vaporized, said method also comprising separating said vapor from the rest of said mixture to leave alkali metal coated particles.

5. A method in accordance with claim 4, also comprising introducing a protective atmosphere of inert gas into association with said alkali metal coated particles.

6. A method in accordance with claim 1 wherein said flowable mixture is heated to a temperature above the melting point of said alkali metal whereby liquid alkali metal contacts said particles.

7. A method in accordance with claim 6 wherein said alkali metal is melted and passed as a liquid into mixture with said particles and said vaporizable liquid.

8. A method in accordance with claim 1 wherein said flowable mixture is initially at a temperature above the melting point of said alkali metal, and is passed as a slurry into said vaporization zone.

9. A method in accordance with claim 1 wherein said alkali metal initially is present in said mixture as solid particles.

10. A method in accordance with claim 1 wherein said vaporizable liquid is one having a boiling point below the melting point of said alkali metal, and wherein said mixture is heated to a temperature between said points whereby said liquid is vaporized but said alkali metal is maintained in the solid state.

11. A method in accordance with claim 1 wherein said vaporizable liquid is one having a boiling point above the melting point of said alkali metal whereby said alkali metal is melted in said vaporization zone, molten particles of said alkali metal impinging upon said solid particles.

References Cited in the file of this patent

UNITED STATES PATENTS

| | | |
|---|---|---|
| 1,954,474 | Espe et al. | Apr. 10, 1934 |
| 2,185,531 | Tykociner et al. | Jan. 2, 1940 |
| 2,317,754 | Gorlich | Apr. 27, 1943 |
| 2,668,757 | Hansley | Feb. 9, 1954 |
| 2,698,815 | Bishop | Jan. 4, 1955 |